United States Patent
Byron et al.

(10) Patent No.: US 9,996,536 B2
(45) Date of Patent: Jun. 12, 2018

(54) DYNAMIC DOCUMENT COLLECTION AND CUSTOM PORTAL CREATION

(71) Applicant: International Business Machines Corporation, Armonk, NY (US)

(72) Inventors: Donna K. Byron, Petersham, MA (US); Renee F. Decker, Brunswick, MD (US); Suzanne L. Estrada, Boca Raton, FL (US); Aditya S. Gaitonde, Marlborough, MA (US); Daniel M. Jamrog, Acton, MA (US); John A. Morganti, Austin, TX (US); Samir J. Patel, Billerica, MA (US); Joseph F. Zaffarano, Malden, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days. days.

(21) Appl. No.: 15/809,037

(22) Filed: Nov. 10, 2017

(65) Prior Publication Data
US 2018/0060316 A1 Mar. 1, 2018

Related U.S. Application Data

(63) Continuation of application No. 15/009,883, filed on Jan. 29, 2016, now Pat. No. 9,852,134.

(51) Int. Cl.
*G06F 17/30* (2006.01)
*H04L 29/08* (2006.01)

(52) U.S. Cl.
CPC .. *G06F 17/30011* (2013.01); *G06F 17/30144* (2013.01); *G06F 17/30598* (2013.01); *G06F 17/30613* (2013.01); *G06F 17/30867* (2013.01); *H04L 67/306* (2013.01); *G06F 17/30873* (2013.01)

(58) Field of Classification Search
CPC ......... G06F 17/30905; G06F 17/30011; G06F 17/30696; G06F 17/30873; G06F 17/30144
See application file for complete search history.

(56) References Cited

U.S. PATENT DOCUMENTS

| 8,886,589 | B2* | 11/2014 | Surendran | ......... G06F 17/30684 707/600 |
| 9,852,134 | B2 | 12/2017 | Byron et al. | |
| 2006/0248059 | A1 | 11/2006 | Chi et al. | |

(Continued)

OTHER PUBLICATIONS

Thelwall, Mike, et al. "Custom interfaces for advanced queries in search engines." Aslib Proceedings. vol. 53. No. 10. MCB UP Ltd, 2001.*

(Continued)

*Primary Examiner* — Nan Hutton
(74) *Attorney, Agent, or Firm* — Cantor Colburn LLP; William Stock

(57) ABSTRACT

Aspects include creating a profile for a user from user account data and a user activity log, searching an indexed repository for keywords matching elements from the user account data and the user activity log, and retrieving documents from the indexed repository that are identified based on the searching. Aspects further include creating a custom portal for the user that includes the documents.

1 Claim, 3 Drawing Sheets

(56) References Cited

U.S. PATENT DOCUMENTS

2010/0149572 A1* 6/2010 St. Jacques, Jr. et al. .................. H04N 1/00244
358/1.13
2011/0125760 A1 5/2011 Frieden et al.
2013/0275455 A1 10/2013 Dutta
2015/0142913 A1* 5/2015 Chaudhari ............ G06F 17/301
709/217
2017/0220566 A1 8/2017 Byron et al.

OTHER PUBLICATIONS

Girgensohn, Andreas, and Alison Lee. "Making web sites be places for social interaction." Proceedings of the 2002 ACM conference on Computer supported cooperative work. ACM, 2002.*
List of IBM Patents or Patent Applications Treated as Related, U.S. Appl. No. 15/809,037, filed Nov. 10, 2017, 2 Pages.

* cited by examiner

DYNAMIC DOCUMENT COLLECTION AND CUSTOM PORTAL CREATION

DOMESTIC PRIORITY

This application is a continuation of U.S. patent application Ser. No. 15/009,883, entitled "DYNAMIC DOCUMENT COLLECTION AND CUSTOM PORTAL CREATION," filed Jan. 29, 2016, the disclosure of which is incorporated by reference herein in its entirety.

BACKGROUND

The invention relates generally to data processing, and more specifically, to dynamic document collection and portal creation in which the collected documents are organized for distribution to custom user portals.

Members of a team often share documents that they believe may be of relevance or interest to other team members. In some cases, a team members interests may remain relatively static. However, in other instances, a team member's interests can change over time based on various factors, such as a change in role within an organization or as the team member's experience and knowledge grows or evolves with respect to a particular subject.

SUMMARY

According to an embodiment a method, system, and computer program product for dynamic document collection. A method includes creating, via a computer processor, a profile for a user from user account data and a user activity log, searching an indexed repository for keywords matching elements from the user account data and the user activity log, retrieving documents from the indexed repository that are identified based on the searching, and creating, via the computer processor, a custom portal for the user that includes the documents.

Additional features and advantages are realized through the techniques of the invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings, which:

DETAILED DESCRIPTION

Embodiments described herein are directed to dynamic document collection and custom user portal generation. The dynamic document collection processes create user profiles from user account data and user activity logs, determine from the user profiles which of a number of documents in a repository are relevant, or may be of interest, to the users, generate custom portals for each of the users that contain the corresponding documents, and facilitate social interactions and information sharing among users who have common profiles and document libraries.

Figure 1:
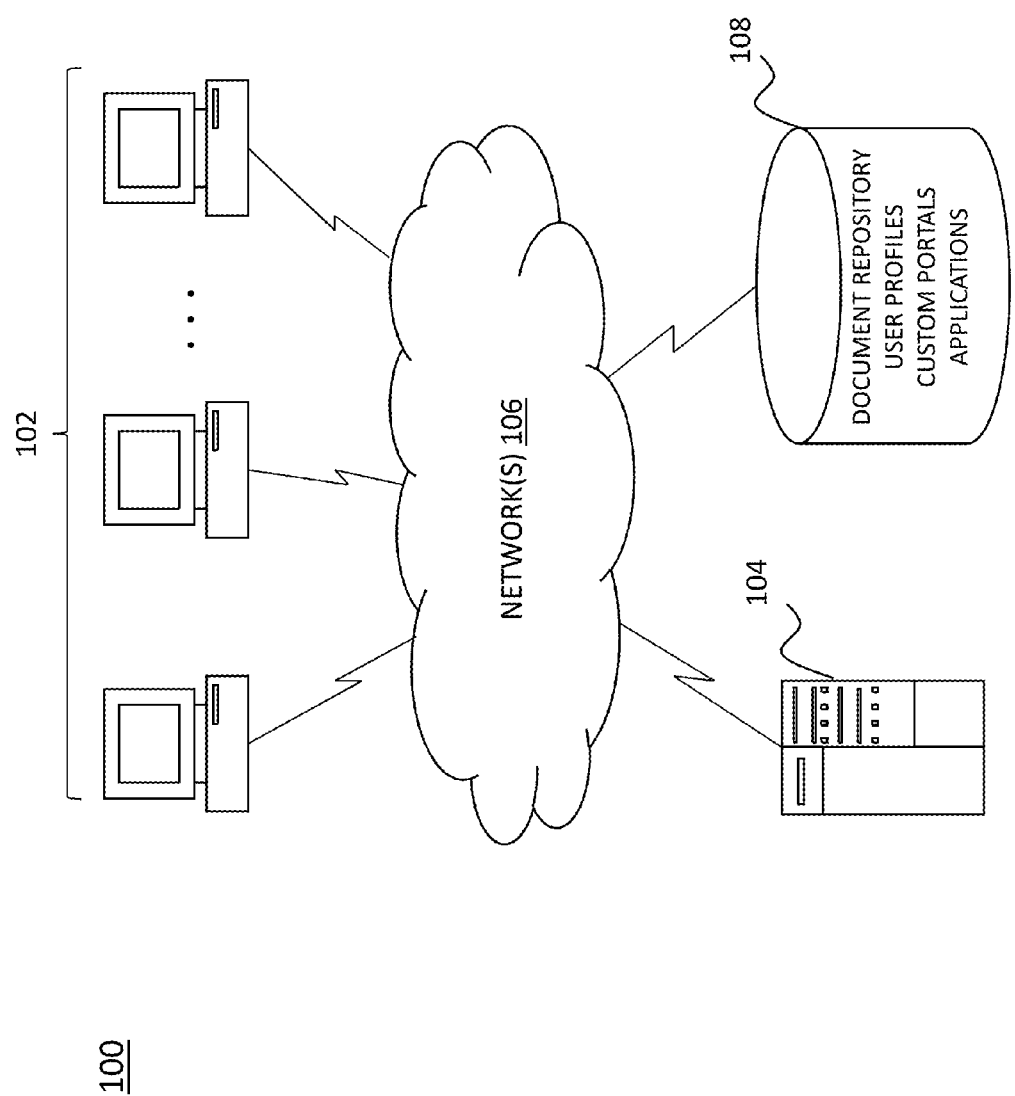
FIG. 1 depicts a block diagram of a system for dynamic document collection in accordance with an embodiment.

Turning now to FIG. 1, a block diagram of a system 100 for dynamic document collection will now be described in accordance with an embodiment. The system 100 includes user devices 102, a host system computer 104, and a storage device 108, each of which is communicatively coupled to one or more network(s) 106.

The user devices 102 may be operated by users who form part of an organization or enterprise that is managed by the host system computer 104 (e.g., in a work environment). The user devices 102 may be implemented as personal computers (e.g., desktop, laptop) or may be portable devices (e.g., smart phone, tablet computer, personal digital assistant, etc.). In one embodiment, the user devices 102 access the host system computer 104, which in turn, provides an interface for implementing the dynamic document collection. Applications that may be implemented by the user devices 102 include, e.g., a standard and/or mobile web browser, an email client application, a textual and/or a graphical user interface, a customized web browser, a plugin, an Application Programming Interface (API), and/or a custom application.

The host system computer 104 may be implemented as a high-speed computer processing device capable of handling the volume of activities conducted among user devices, such as user devices 102, the storage device 108, and the host system computer 104. The host system computer 104 may be operated by an entity that provides the dynamic document collection as a service to employees of an enterprise. For example, the host system computer 104 may execute one or more applications to coordinate with the storage device 108 and user devices 102, to perform a variety of functions, such as create user profiles from user account data and user activity logs, determine from the user profiles which of a number of documents in a repository are relevant, or may be of interest, to the users, and facilitate social interactions among users who have common profiles and shared document libraries.

The storage device 108 may be implemented using a variety of devices for storing electronic information. It is understood that the storage device 108 may implemented using memory contained in the host system computer 104 or it may be a separate physical device, as illustrated in FIG. 1. The storage device 108 may be logically addressable as a consolidated data source across a distributed environment that includes one or more networks, such as network(s) 106. Information stored in the storage device 108 is retrieved and manipulated via the host system computer 104, as well as by end users of the dynamic document collection processes.

In an embodiment, the storage device 108 stores one or more document repositories, user profiles, custom portals, and applications. The document repository may store documents for use in facilitating operations conducted by the enterprise of the host system computer 104. For example, documents may include work forms (e.g., including those authored by users), news articles, manuals, company policies, and related items. The documents can be procured by any member of the organization, such as users of the user devices 102, and uploaded to the repository. In an embodiment, some of the documents may be acquired, e.g., through a subscription to an external document or information provider. In another embodiment, analytics may be applied to documents in external repositories and any documents determined to be of interest or relevant to a user may be stored in the user's custom portal. For instance, one aspect of a user profile may include a listing of repositories, which may include one or more internal and/or external repositories.

In an embodiment, the host system computer 104 processes the documents and marks the documents with tags that coincide with one or more topics or key words associated with the document contents. The documents can be classified by subject matter (and additionally, by time reference if desired) by the host system computer 104, which then indexes and stores the documents in the storage device 108.

The dynamic document collection processes create profiles for the users from user account data and user activity logs. The user account data may include user role in the organization, user title, user work history including positions previously held, team membership or subcommittee membership, social network profile information, etc. The activity logs may include logged information from user search sessions, user interactions with other users, and documents accessed and/or shared by the user from the repository and/or from the user's own custom portal. The activity log information may also include bookmarked information from a user's web browser. The dynamic document collection creates the user's custom portal by identifying elements (e.g., subject line in an email, descriptions, notes, calendar invitations, to do lists, etc.) from the user profile and activity logs, and searching the document repository for key words that match these elements. The dynamic document collection compiles these documents and adds them to the portal along with other features, e.g., messaging, a search engine, and community memberships. In an embodiment, the dynamic document collection processes defines a set of tags for use in matching elements of the user profile to documents in one or more repositories. The dynamic document collection applies analytics to the documents and the documents are given a set of tags. The analytics performed may include transforming the documents into tf-idf vectors and computing the (cosine) similarity among them. Similar documents may be given the same tags. The analytics may include identifying the subject in the title of the document, and/or identifying named entities in a document and evaluating whether the named entities are people who work on the same project or whether the person is mentioned in the document (e.g., the document is a set of meeting minutes and the person has an action item).

In an embodiment, the user profile may include information that is curated in the very beginning before the user starts to use the dynamic document collection. The initial user profile created before the user begins to use the dynamic document collection may be used as a baseline of information by the dynamic document collection, which is updated over time in response to user sessions conducted from user searches and user communications. Thus, the user profile may also be extended over time by an analysis of the activity logs of the user, factoring in the kinds of searches he/she makes. The user profiles are updated by the dynamic document collection to reflected changes in the user's role, team memberships, subcommittee memberships, and other changes.

Applications implemented by the host system computer 104 include a dynamic document collection application. The dynamic document collection application may be a standalone application, or may be an applet, application, script, or extension that may interact with or be executed within a component of other applications implemented by the host system computer 104. The dynamic document collection application performs the exemplary processes described herein. The dynamic document collection application may include one or more user interfaces, such as browsers and textual or graphical user interfaces, through which users (e.g., a user of user device 102), may access functions of the dynamic document collection.

The networks 108 may be any type of known networks including, but not limited to, a wide area network (WAN), a local area network (LAN), a global network (e.g. Internet), a virtual private network (VPN), and an intranet. The networks 108 may be implemented using wireless networks or any kind of physical network implementation known in the art, e.g., using cellular, satellite, and/or terrestrial network technologies. The networks 108 may also include short range wireless networks utilizing, e.g., BLUETOOTH™ and WI-FI™ technologies and protocols.

While the system 100 of FIG. 1 illustrates an embodiment in which the host system computer 104 implements applications for performing the dynamic document collection described herein, it will be understood that at least a portion of the applications can be resident on and executable by the user devices 102.

Figure 2:
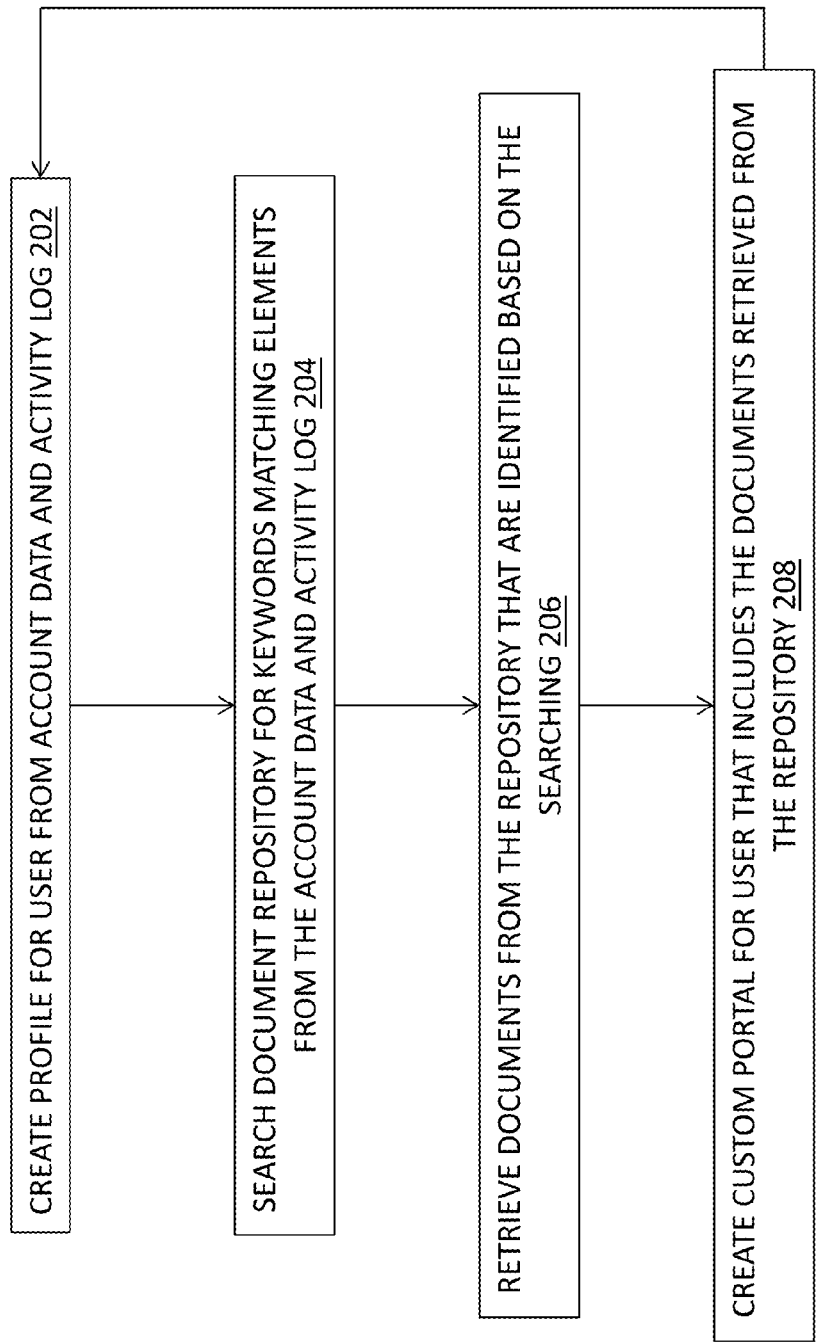
FIG. 2 depicts a flow diagram of a process for dynamic document collection in accordance with an embodiment.

Turning now to FIG. 2, a flow diagram describing the dynamic document collection processes will now be described in an embodiment. The process 200 of FIG. 2 assumes that a repository of documents has been processed and indexed for creating the user's custom portal. This may be initiated in response to receiving a set of documents (e.g., from user devices 102 or through the host system computer 104), tagging the document with keywords from parsed elements of the documents, and storing the documents and corresponding keywords in the repository.

In block 202, the dynamic document collection creates a profile for a user from the user's account data and user activity log.

In block 204, the dynamic document collection searches the indexed repository for keywords that match elements from the user account data and the user activity log.

In block 206, the dynamic document collection retrieves documents from the indexed repository that are identified from the search performed in block 204.

In block 208, the dynamic document collection creates the custom portal for the user that includes the documents resulting from the search. In an embodiment, the custom portal also includes features that enable the user to search the documents in the portal, view a listing of the documents, perform messaging functions with respect to other users, and engage in interactions with a social community.

The dynamic document collection monitors changes over time in the user account data and ongoing activities from the user activity log. The dynamic document collection updates the custom portal for the user based on changes to the user account data and the ongoing activities. For example, one of the changes in the user account data includes a change in role of the user with respect to the organization. In this manner, the documents searched in the repository may contain keywords associated with the user's new role. It will be understood that the processes described in FIG. 2 may be iterated in a loop fashion, e.g., as updates are determined from the user account and activity logs, as well as when additional documents are added to the repository.

In an embodiment, the dynamic document collection tracks the documents associated with various custom portals created for the users. For example, the dynamic document collection may compare a listing of documents in the custom portal of the user to listings of documents in custom portals of other users. Upon determining that the custom portal of the user contains a minimum number of documents that are in common with another custom portal of another user, the dynamic document collection may generate a communication to the user, through the custom portal of the user, identifying the user of the other custom portal as having common interests with the user. In this manner, the user receiving the communication may choose to communicate with the other user and perhaps share additional documents.

In addition to the above-referenced tracking, the dynamic document collection may monitor activities conducted by the user at the custom portal. In response to determining the user has not opened a document in the custom portal within a threshold period of time, the dynamic document collection may automatically remove the document from the custom portal. This provides a means in which the dynamic document collection can weed out documents that the user has not demonstrated an interest in. It can also provide a means to weed out outdated documents that may no longer be of use to the user. For example, a document contains a policy that becomes superseded by another policy. The document containing the outdated policy can be deleted whether or not the user has accessed the document.

In addition, in response to determining that the user has opened documents in the custom portal that share a common set of keywords (e.g., documents containing the particular tags appear to be more frequently accessed by the user than documents that do not contain the tags), the dynamic document collection may prioritize the listing of each of the documents in the custom portal based on the common set of tags. For example, the documents having the common set of tags are displayed before other documents in the portal.

In an embodiment, additional documents may be added automatically to the custom portal if not present, such as documents linked in the user's calendar invitations. Also, a reference to additional documents attached in emails could be shared and removed from a mail repository, thereby saving disk space.

Figure 3:
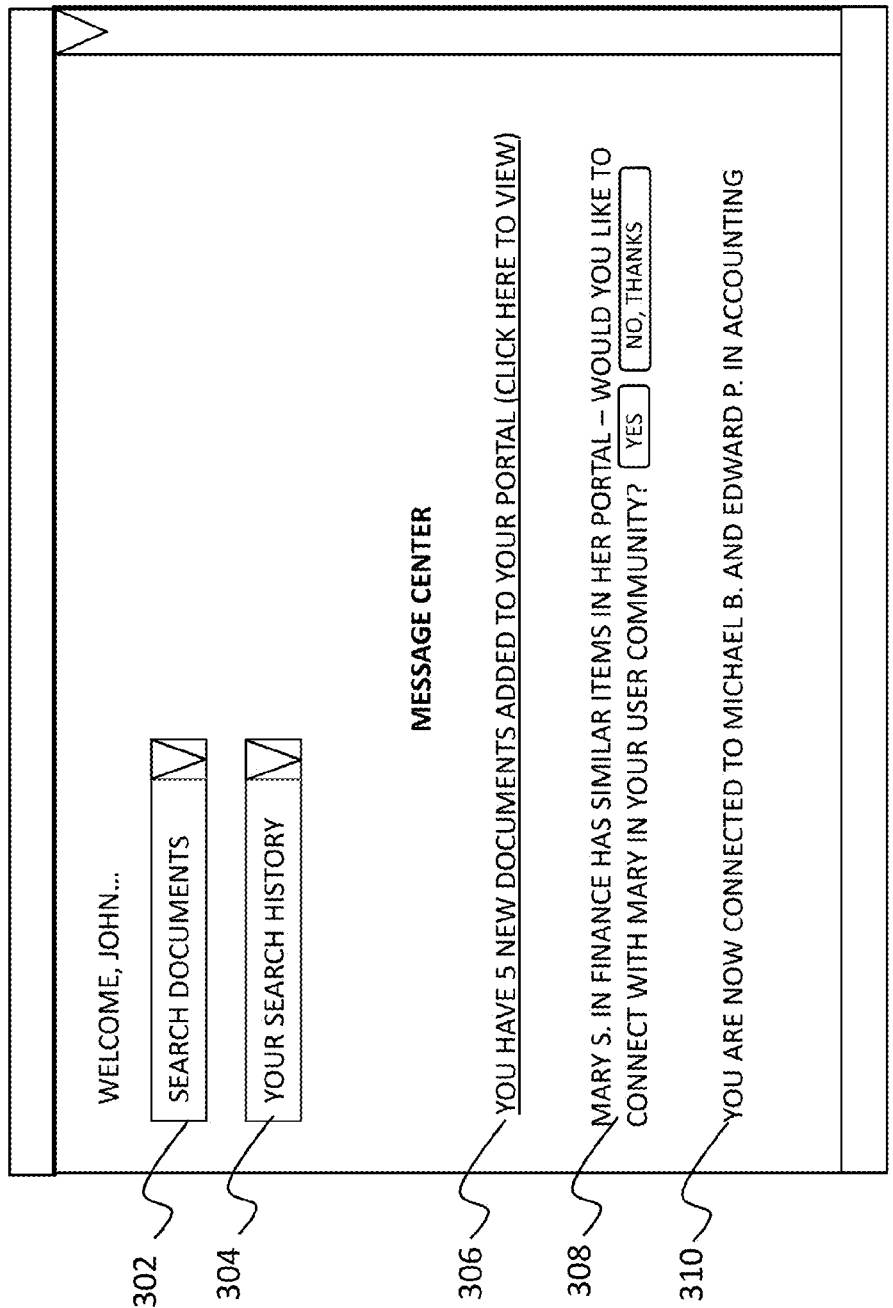
FIG. 3 depicts a custom portal interface screen in accordance with an embodiment.

Turning now to FIG. 3, a custom user portal interface screen 300 (referred to herein as simply 'custom portal) with sample data will now be described. The custom portal 300 provides features that enable the user to search for documents that have been selected by the dynamic document collection as being of potential interest or relevance to the user based on the user's account data and activity logs. As shown in FIG. 3, by way of non-limiting example, an option 302 provides a drop down feature that, upon selection, may provide search topics and/or a general option to view all documents saved for the portal 300. In addition, the custom portal 300 may include a feature that enables the user to review his/her search history with regard to documents previously searched and/or accessed. This option 304 enables the user to go back to previous searches to find documents that the user would like to revisit.

The custom portal 300 may also include a message center that notifies the user whenever new documents are added to the portal (e.g., via option 306). As shown in FIG. 3, this option may be provided as a link to the new documents. In addition, as indicated above, the dynamic document collection may track documents in all custom portals and compare them to see if certain users may have common interests or goals. For example, a threshold number or percentage of common documents identified between two custom portals may cause the dynamic document collection to generate a communication in the message center (e.g., communication 308) for one or both of the users of these custom portals, which identifies the other user, and prompts the user to connect with the other user (e.g., through email or message groups, social media or community memberships, etc.). Any such agreed upon connections can be identified in the message center as well, e.g., connection notification 310 in FIG. 3.

Technical effects and benefits include the ability to create user profiles from user account data and user activity logs, determine from the user profiles which of a number of documents in a repository are relevant, or may be of interest, to the users, generate custom portals for each of the users that contain the corresponding documents, and facilitate social interactions and information sharing among users who have common profiles and document libraries. Technical effects further include generating keywords for documents in a repository through various analytics techniques.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory having computer readable instructions; and
a processor for executing the computer readable instructions, the computer readable instructions including:
creating a profile for a user from user account data and a user activity log;
searching an indexed repository for keywords matching elements from the user account data and the user activity log;
retrieving documents from the indexed repository that are identified based on the searching;
creating a custom portal for the user that includes the documents;
in response to determining that the user has not opened a document in the custom portal within a threshold period of time, automatically removing the document from the custom portal for the user;
monitoring activity conducted by the user at the custom portal;
in response to determining that the user has opened documents in the custom portal that share a common set of tags, prioritizing the listing of each of the documents in the custom portal based on the common set of tags;
comparing a listing of documents in the custom portal of the user to determine whether the custom portal of the user contains a minimum number of documents that are in common with another portal;
in response to determining that the custom portal of the user contains the minimum number of documents that are in common with another custom portal, generating a communication to the user, through the custom portal of the user, identifying a user of the other custom portal as having common interests with the user;
monitoring changes in the user account data and ongoing activities from the user activity log; and
updating the custom portal for the user based on updated keyword searching responsive to the changes to the user account data and the ongoing activities.

* * * * *